United States Patent
Hamada (10) Patent No.: US 7,629,719 B2
(45) Date of Patent: Dec. 8, 2009

(54) AC GENERATOR FOR VEHICLES

(75) Inventor: Hiroshi Hamada, Anjo (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 12/222,084

(22) Filed: Aug. 1, 2008

(65) Prior Publication Data
US 2009/0033181 A1 Feb. 5, 2009

(30) Foreign Application Priority Data
Aug. 3, 2007 (JP) ............... 2007-202435

(51) Int. Cl.
H02K 1/32 (2006.01)
(52) U.S. Cl. ................... 310/68 D
(58) Field of Classification Search ............... 310/68 D, 310/71, 68 R; 290/38 R
See application file for complete search history.

(56) References Cited

U.S. PATENT DOCUMENTS

| 6,707,691 | B2 * | 3/2004 | Bradfield | 363/145 |
| 6,867,517 | B2 * | 3/2005 | Kumagai | 310/68 D |
| 2004/0041476 | A1 * | 3/2004 | Ihata et al. | 310/68 D |
| 2006/0192446 | A1 | 8/2006 | Ihata et al. | |
| 2007/0170821 | A1 | 7/2007 | Hamada | |

FOREIGN PATENT DOCUMENTS

| JP | A-2002-95215 | 3/2002 |
| JP | A-2002-101626 | 4/2002 |
| JP | A-2003-032980 | 1/2003 |
| JP | A-2003-169457 | 6/2003 |
| JP | A-2004-147486 | 5/2004 |
| JP | A-2005-176423 | 6/2005 |
| JP | A-2007-195355 | 8/2007 |

* cited by examiner

*Primary Examiner*—Quyen Leung
*Assistant Examiner*—Leda Pham
(74) *Attorney, Agent, or Firm*—Oliff & Berridge, PLC (57) ABSTRACT

According to an AC generator for vehicles of the present invention, a terminal mount includes an L-shaped support having a radial extension, in which a metal terminal is contained and which radially extends about a rotary shaft of a rotor, and an axial extension, which extends from an end of the radial extension toward a rear cover along the rotary shaft, and at least one first guide molded integral with the L-shaped support. A radiating fin includes a second guide having a shape corresponding to a shape of the first guide. One of the first guide and the second guide is inserted into the other of the first guide and the second guide.

16 Claims, 7 Drawing Sheets

AC GENERATOR FOR VEHICLES

CROSS REFERENCE TO RELATED APPLICATION

This application is based on and claims the benefit of priority from earlier Japanese Patent Application No. 2007-202435 filed Aug. 3, 2007, the description of which is incorporated herein by reference.

BACKGROUND OF THE INVENTION

1. Technical Field of the Invention

The present invention relates to an AC generator (i.e., alternator) for vehicles, which is mounted, for example, in motor trucks, construction machines and agricultural machines.

2. Related Art

In recent years, manufacturers of passenger automobiles and motor trucks have made their continual efforts to improve the engines in order to comply with the emission regulations. This improvement thus tends to increase the ambient temperature of the components mounted on an engine. On the other hand, there is a yearly increasing demand for devices that ensure safety in travel, as well as increasing demand for additional power supplies and enhancement in in-vehicle amenity, which in turn has increased electrical loads applied to an alternating current (AC) generator (alternator) in a vehicle.

AC generators for vehicles can be divided into two types in terms of its brush structure. One is AC generators with brushes, which are mainly used for passenger automobiles. The other is known as brushless AC generators, which generally have a long life and are mainly used for motor trucks of long-distance and long-duration travel, as well as construction and agricultural machines obliged to work in adverse environments with swirling dust. Such a brushless AC generator is disclosed, for example, in Japanese Patent Laid-open Publication No. 2002-095215.

Generally, markets and users require that components of such AC generators can be changed without special tools. Specifically, such components as a rear cover, a housing, a rectifier, field windings, a rotor, a stator, bearings are demanded to be fixed with screws so that attachment/detachment can be facilitated when, for example, these components are changed. Briefly, AC generators having good service performance are demanded to be manufactured.

Japanese Patent Laid-Open Publication No. 2003-169457, for example, discloses an AC generator for vehicles, in which the stator windings and the rectifier are fixedly screwed to establish electrical connection. However, in a brushless AC generator, the side wall of the rear housing may often be axially extended toward the rear cover, in order to prevent damage to the electrical components, such as the rectifier and the regulator, which damages are caused by external forces induced by pebbles or the like in the working area. In this case, if the side wall interferes with the screwing position of the rectifier, the fixation with a screw will be physically impossible.

Japanese Patent Laid-Open Publication Nos. 2002-095215 and 2005-176423, for example, disclose another vehicular AC generator. According to these literatures, each lead of the stator windings is caulked to a portion in the rear housing, which is near the surface where the rectifier is attached, and then soldered or welded for fixation. As mentioned above, in the case where the side wall of the rear housing is axially extended toward the rear cover, welding or soldering for fixation of the leads may impair the service performance of the AC generator because of the presence of the side wall of the rear housing.

Accordingly, in order to electrically connect the leads of the stator windings and the rectifier in consideration of the service performance, the best approach may be to set a fixedly screwing position at a position higher than the side wall of the rear housing. However, the change in the screwing position of each lead of the stator windings may cause, in turn, another problem of increasing the length of the lead.

A rectifier of the AC generator has a plus-side (positive electrode side) radiating fin and a minus-side (negative electrode side) radiating fin, to each of which a plurality of rectifying elements are attached. If cooling air is directly blown to the sealed portion of each of the rectifying elements, an electrically conductive liquid containing a snow melting agent, for example, is very likely to be directly in contact with the sealed portion, which will create undesirable conditions as far as the environmental resistance is concerned. Creation of such undesirable conditions may be prevented by directing each lead, which is drawn from the sealed portion of the rectifying element, to the direction opposite to the rear cover. However, this may necessarily permit metal terminals (metallic terminals) on a terminal mount (terminal table) to be located on the side of the rear housing, which metal terminals are to be electrically connected to the respective leads of the rectifying elements. Accordingly, the terminal mount included in the rectifier may mostly be located at a position closest to the rear housing. Thus, the terminal mount is formed with a plurality of L-shaped supports (L-shaped legs), each axially extending from a surface of the rear housing, on which the rectifier is mounted, and extending toward the rear cover, with a fixedly screwing portion being provided at its end for establishing electrical connection with each lead of the stator windings.

However, there is a long distance between the fixedly screwing portion provided at the end of each L-shaped support and the base portion of the L-shaped support on the side of the rear housing. Therefore, in fixedly conducting screwing, bending stress will be imposed on the L-shaped support of the terminal mount. Thus, problematically excessive bending stress of assemblage has been caused at the base portion of each lead of the stator windings, as well as the caulked portion between the lead and the metal terminal attached to the end of the lead.

One approach for reducing the bending stress may be to mechanically fix the vicinity of the fixedly screwing portions of the terminal mount against the radiating fin, fixing with a screw or ultrasonic welding. Another approach may be to replace each lead of the stator windings with a stranded wire. However, these approaches may involve high manufacturing cost and high component cost. Thus, if emphasis is put on reducing the costs, these approaches are difficult to be employed.

SUMMARY OF THE INVENTION

The present invention has been made in light of the circumstances provided above, and has as its object to provide an AC generator for vehicles, which is able to reduce bending stress generated in fixedly screwing the leads of the stator windings to the rectifier.

In order to resolve the problem explained above, an AC generator for vehicles of the present invention includes: a stator having a stator winding; a rotor disposed inside the stator so as to oppose to the stator; a field windings that generates magnetic flux to be supplied to the rotor; a rectifier including at least one radiating fin to which a plurality of rectifying elements are attached and a terminal mount in which a metal terminal is contained, the rectifying elements rectifying output voltage of the stator winding and outputting the rectified voltage, and the metal terminal connecting the rectifying elements to a lead of the stator winding; a housing that accommodates the stator and the rotor; and a rear cover that protects electrical components including the rectifier mounted on a rear-side end of the housing, wherein the terminal mount includes an L-shaped support having a radial extension, in which the metal terminal is contained and which radially extends about a rotary shaft of the rotor, and an axial extension, which extends from an end of the radial extension toward the rear cover along the rotary shaft, and at least one first guide molded integral with the L-shaped support, the radiating fin includes a second guide having a shape corresponding to a shape of the first guide, and one of the first guide and the second guide is inserted into the other of the first guide and the second guide.

In screwing the end of each lead of the stator windings to the end of the metal terminal incorporated in the L-shaped support, the possible torsion and deformation in the L-shaped support, which would be caused in the screwing direction, can be suppressed because the first guide comes into contact with the second guide. This will thus suppress the bending stress that would be generated at a base portion of the lead of the stator winding. Also, the convex shape of the first guide, which is integrally molded to the L-shaped support, may give another advantage of suppressing the bending of the L-shaped support in the axial direction of the rotary shaft.

In the AC generator, the at least one radiating fin comprises a first radiating fin and a second radiating fin such that a distance between the first radiating fin and a mounting surface of the housing is shorter than a distance between the second radiating fin and the mounting face. In addition, the second guide of the first radiating fin has a cylindrical shape and the corresponding first guide is press-fitted to the second guide.

Thus, in fixedly screwing each end of the lead of the stator windings, the first guide of the radiating fin disposed at the position in the housing, which is near the surface where the rectifier is attached, can serve as a fulcrum when the L-shaped support is deformed, which may contribute to further suppressing the deformation of the L-shaped support.

In the AC generator, the at least one radiating fin comprises a first radiating fin and a second radiating fin such that a distance between the first radiating fin and a mounting surface of the housing is shorter than a distance between the second radiating fin and the mounting surface, and only the second radiating fin includes the second guide.

This will fix the radial position of the axial extension of the L-shaped support, the radial position being in the vicinity of the end of the extended portion, whereby the bending stress can be mitigated, which is generated in fixedly screwing the end of each lead of the stator windings.

An AC generator for vehicles of the present invention includes: a stator having a stator winding; a rotor disposed inside the stator so as to oppose to the stator; a field windings that generates magnetic flux to be supplied to the rotor; a rectifier including radiating fin to which a plurality of rectifying elements are attached and a terminal mount in which a metal terminal is contained, the rectifying elements rectifying output voltage of the stator winding and outputting the rectified voltage, and the metal terminal connecting the rectifying elements to a lead of the stator winding; a housing that accommodates the stator and the rotor; and a rear cover that protects electrical components including the rectifier mounted on a rear-side end of the housing, wherein the terminal mount includes an L-shaped support having a radial extension, in which the metal terminal is contained and which radially extends about a rotary shaft of the rotor, and an axial extension, which extends from an end of the radial extension toward the rear cover along the rotary shaft, the axial extension includes outer surfaces which sandwich the metal terminal therebetween and radially open, and the radiating fin is disposed in the opposite sides to the metal terminal with respect to the outer surfaces so as to oppose to the outer surfaces in the vicinity of the outer surfaces.

Thus, the possible torsion and deformation of the L-shaped support in the screwing direction can be suppressed because the outer surfaces come into contact with the radiating fin, whereby the bending stress can be suppressed from being generated in a base portion, for example, of each lead of the stator windings.

In the AC generator, the radiating fin has a plurality of auxiliary fins which are integrated with the radiating fin and extend in the axial direction, and at least one of the plurality of auxiliary fins is disposed so as to oppose to the outer surface.

Thus, deformation of the L-shaped supports can be steadily reduced with the provision of the larger volume for the contact between the outer surfaces and the radiating fin.

In the AC generator, the at least one of the plurality of auxiliary fins has a thickness in the circumferential direction greater than that of the other auxiliary fins.

Thus, deformation in the L-shaped support can be further reduced.

DETAILED DESCRIPTION OF THE PREFERRED EMBODIMENTS

Figure 1:
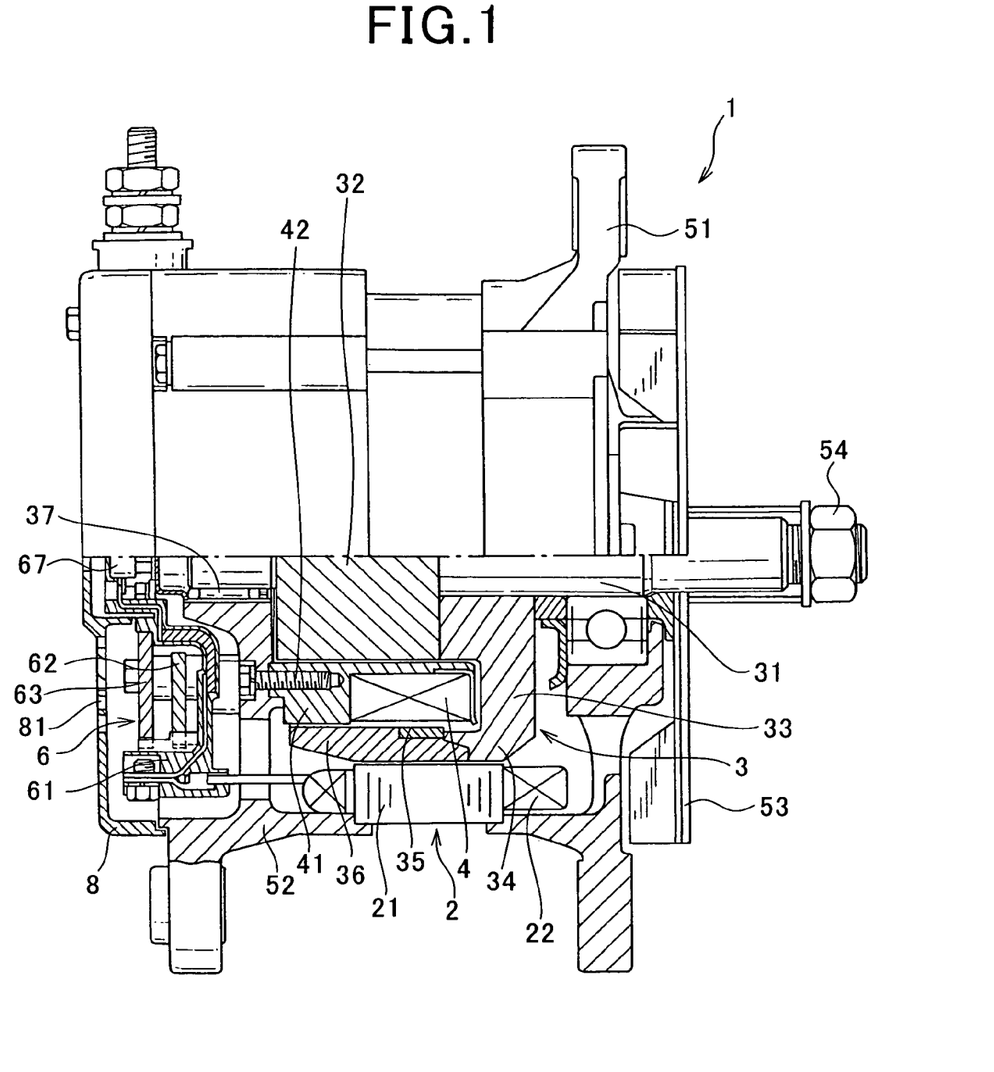
FIG. 1 is a partial cross-sectional side view illustrating a general configuration of an AC generator for vehicles, according to an embodiment of the present invention.
Figure 2:
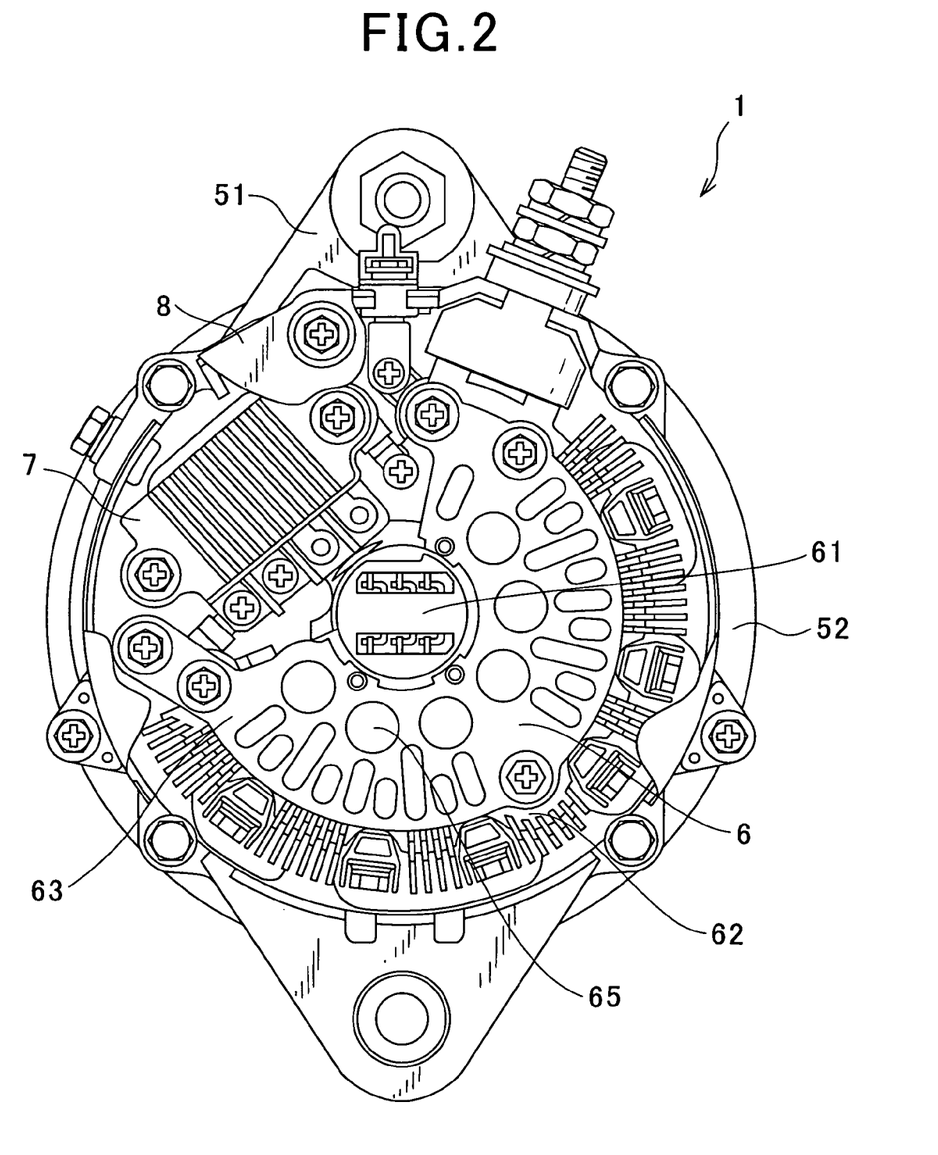
FIG. 2 is a rear view illustrating a general configuration of an AC generator for vehicles, according to the embodiment.

With reference to the accompanying drawings, hereinafter will be described, in detail, a brushless AC (alternating current) generator for vehicles according to an embodiment of the present invention. FIG. 1 is a partial cross-sectional side view illustrating a general configuration of the brushless AC generator for vehicles, according to the embodiment. FIG. 2 is a rear view illustrating a general configuration of the brushless AC generator for vehicles according to the embodiment.

As shown in FIGS. 1 and 2, a brushless AC generator 1 for vehicles (hereinafter just referred to "brushless AC generator 1") includes a stator 2, a rotor 3, field windings 4, a front housing 51, a rear housing 52, a rectifier 6, a regulator 7 and a rear cover 8.

The stator 2 serves as an armature and is provided with a stator core 21 having turns of stator windings 22. The rotor 3 serves as a field magnet and is disposed on the side of the inner periphery of the stator 2, being opposed thereto. The rotor 3 includes: rotating yokes 32 and 33 which rotate with a rotary shaft 31; claw poles 34 integrally formed with the rotating yoke 33; and claw poles 36 integrated into the claw poles 34 through a ring support member 35. A bearing 37 is provided at the rear end portion of the rotary shaft 31 to rotatably hold the rotary shaft 31.

The field windings 4 have a function of generating magnetic flux to be supplied to the rotor 3 and are wound about a stationary yoke 41. The stationary yoke 41 is a cylindrical member fixed to the rear housing 52 by means of a bolt 42. The stationary yoke 41 constitutes a part of the field magnet structured by the rotor 3.

The front housing 51 and the rear housing 52 support the stator 2 and the rotor 3. The bearing 37 mentioned above is press-fitted to the rear housing 52 for fixation. The rotary shaft 31 has an end portion projected from the front housing 51. A cooling fan 53 and a pulley (not shown) are fixedly clamped to the projected rotary shaft 31 by means of a nut 54. The regulator 7 controls the output voltage of the brushless AC generator 1 by intermittently supplying excitation current to the field windings 4. The rear cover 8 protects the electrical components including the rectifier 6 and the regulator 7. The rear cover 8 is made of a resin material and has a plurality of suction holes 81 for introducing cooling air into the interior (into the side of the electrical components).

A detailed description is now given on the rectifier 6. The rectifier 6 includes a plus-side (positive electrode side) radiating fin 62 and a minus-side (negative electrode side) radiating fin 63, which are built up, being opposed to and axially distanced from each other, sandwiching a terminal mount (terminal table) 61 therebetween. The plus-side radiating fin 62 located at a position which is near the surface of the rear housing 52, on which the rectifier is mounted, corresponds to a first radiating fin. The minus-side radiating fin 63 located at a position which is far from the surface of the rear housing 52 corresponds to a second radiating fin. That is, a distance between the plus-side radiating fin 62 and the mounting surface of the rear housing 52 is shorter than a distance between the minus-side radiating fin 63 and the mounting face. Six plus-side rectifying elements (not shown) are attached to the plus-side radiating fin 62 by being press-fitted to respective six attachment through holes formed in the fin 62. Similarly, six minus-side rectifying elements 65 are attached to the minus-side radiating fin 63 by being press-fitted to respective six attachment through holes formed in the fin 63. A set of three plus-side rectifying elements and three minus-side rectifying elements 65 constitute a three-phase full-wave rectifying circuit. The rectifier 6 of the present embodiment is provided with two sets of such three-phase full-wave rectifying circuits, whereby the output voltage of the stator windings 22 is rectified so that the output current can be externally outputted through the output terminals fixed to the plus-side radiating fin 62. The rectifier 6 has three auxiliary diodes 67 which rectify the voltage induced by the stator windings 22 to supply the excitation current to the field windings 4. The auxiliary diodes 67 are attached to the terminal mount 61.

Figure 3:
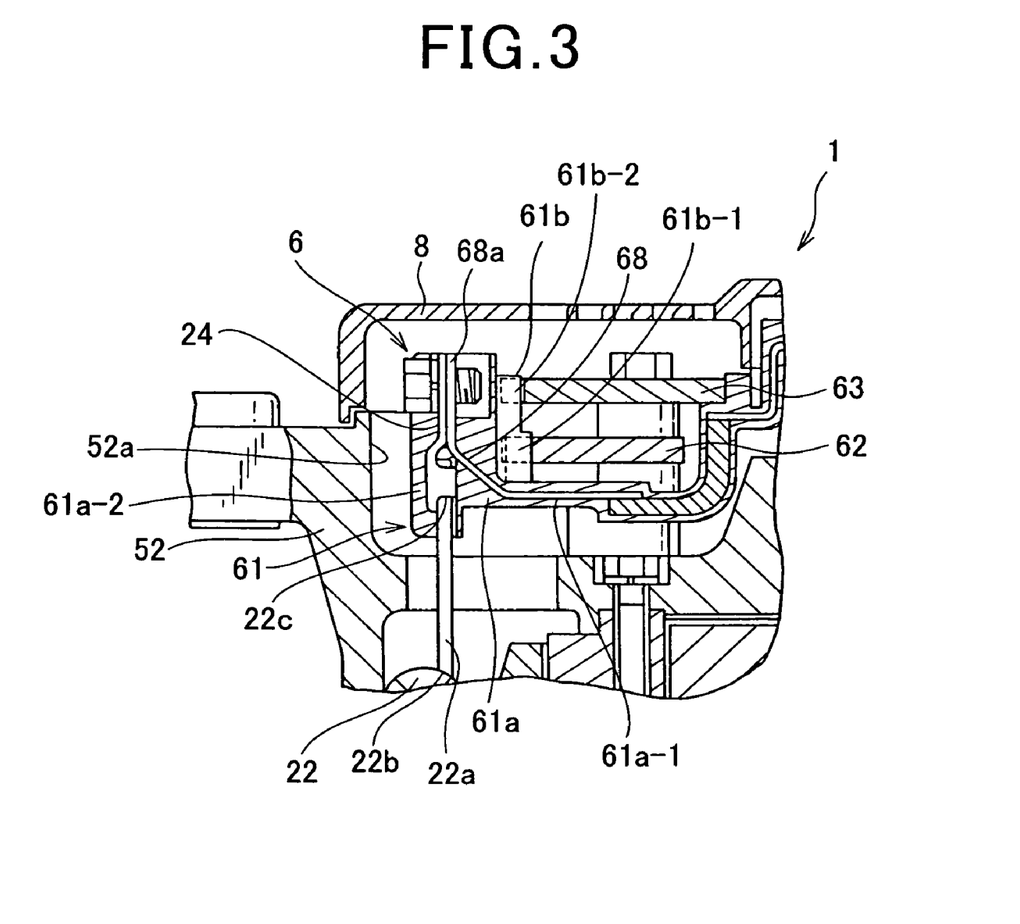
FIG. 3 is a partial cross-sectional view illustrating a rectifier according to the embodiment.
Figure 4:
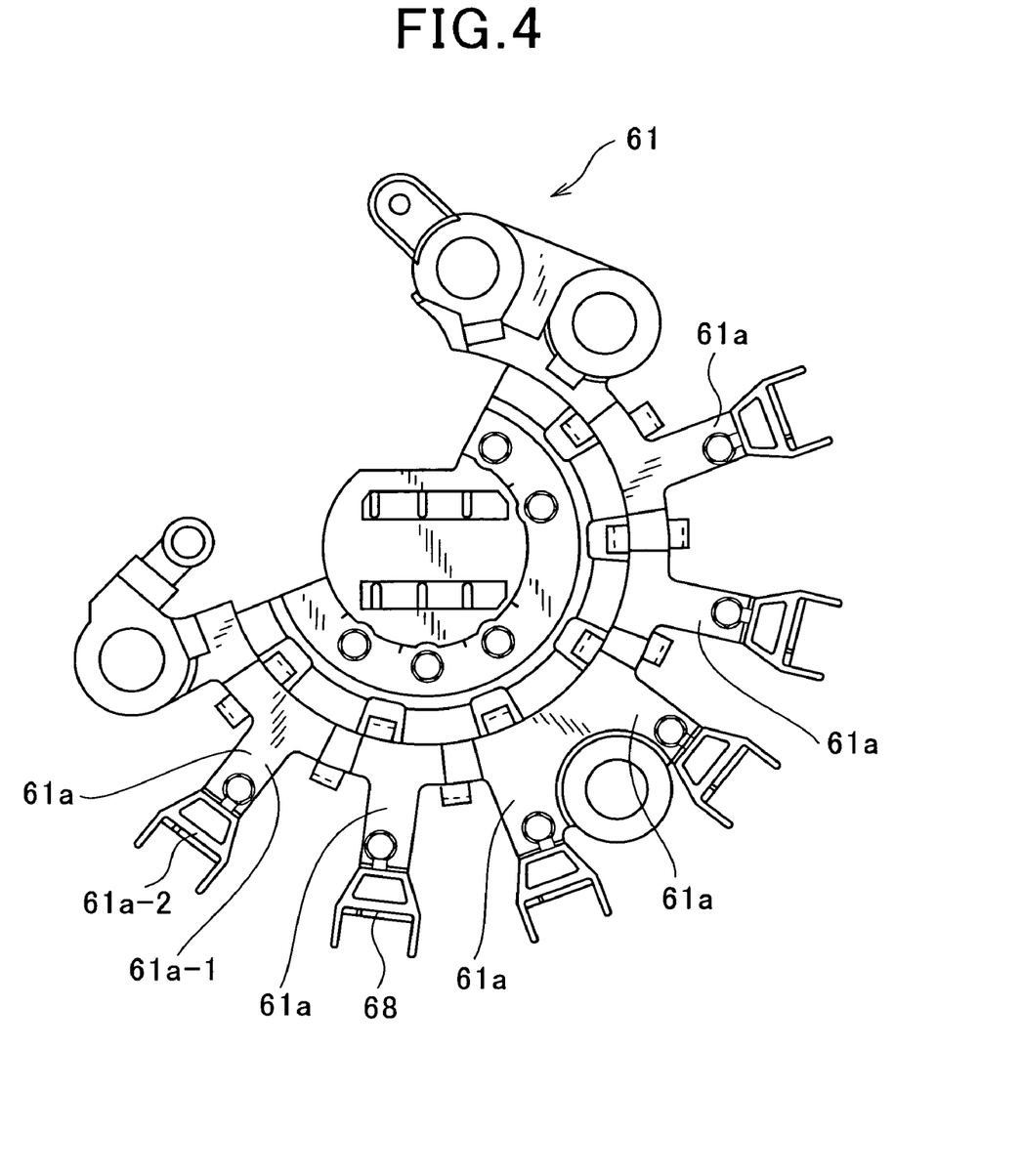
FIG. 4 is a plan view illustrating the shape of a terminal mount of the rectifier.
Figure 5:
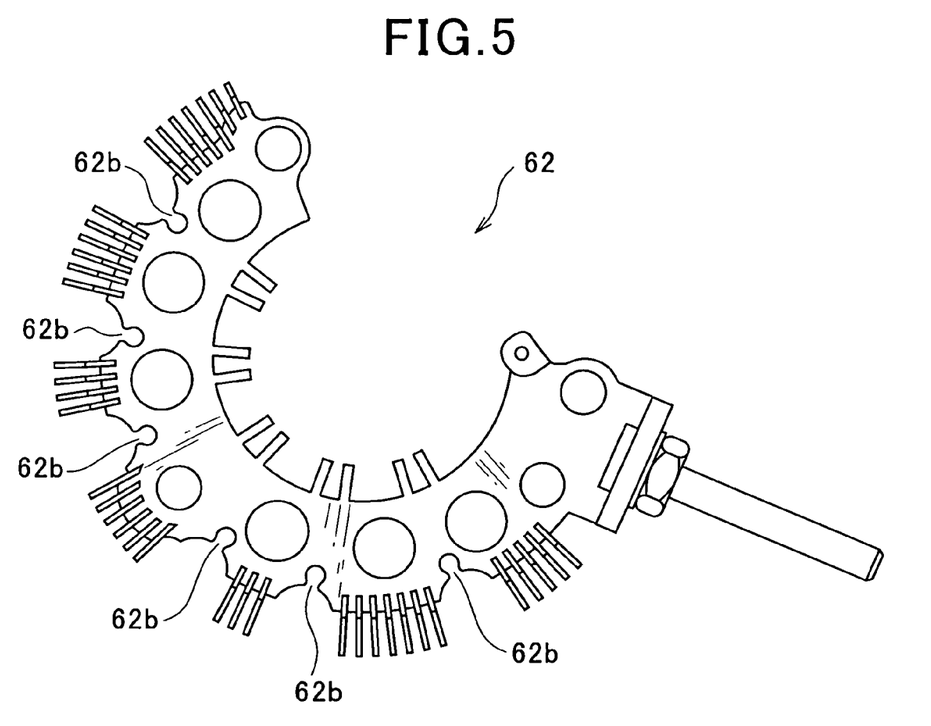
FIG. 5 is a plan view illustrating the shape of a plus-side radiating fin of the rectifier.
Figure 6:
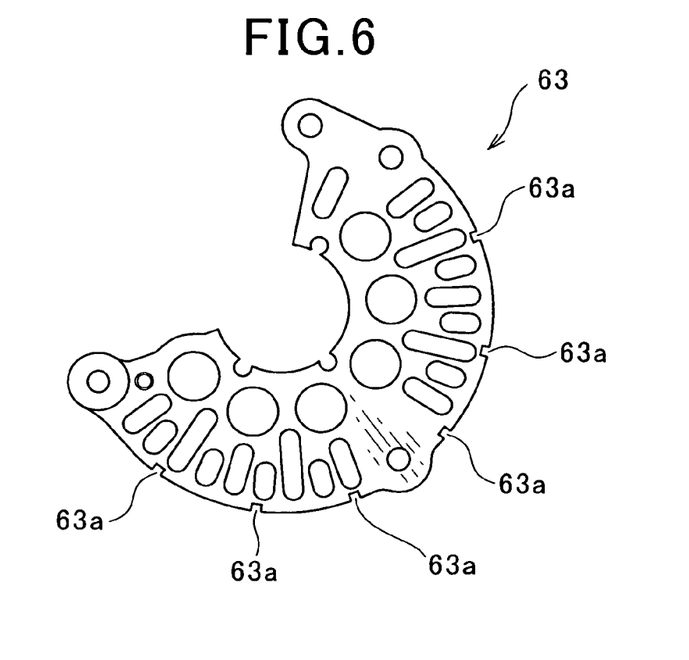
FIG. 6 is a plan view illustrating the shape of a minus-side radiating fin of the rectifier.

FIG. 3 is a partial cross-sectional view illustrating the rectifier 6. FIG. 3 shows a state where the rectifier 6 has been assembled to the brushless AC generator 1. FIG. 4 is a plan view illustrating the shape of the terminal mount 61 of the rectifier 6. FIG. 5 is a plan view illustrating the shape of the plus-side radiating fin 62 of the rectifier 6. FIG. 6 is a plan view illustrating the shape of the minus-side radiating fin 63.

The terminal mount 61 is incorporated with metal terminals 68 by insert molding, and is provided with six L-shaped supports (L-shaped legs) 61a which are disposed along the circumference being distanced from each other. The six L-shaped supports 61a have a function of establishing electrical conduction between the plus-side rectifying elements and the minus-side rectifying elements 65, through six winding leads 22a drawn out of the stator windings 22 of the stator 2 and the metal terminals 68. Each of the L-shaped supports 61a is formed of a radially extended portion (radial extension) 61a-1 which is extended in the radial direction centering on the rotary shaft 31, and an axially extended portion (axial extension) 61a-2 which is extended from the end of the radially extended portion 61a-1 toward the rear cover 8 along the rotary shaft 31. The radially extended portion 61a-1 is perpendicular to the axially extended portion 61a-2 to provide the shape of "L".

The metal terminal 68 is exposed at the end of each L-shaped support 61a. Meanwhile, a metal terminal 24 is fixed to each winding lead 22a by caulking or soldering, or welding, or the like. The metal terminal 24 fixed to the winding lead 22a in this way is clamped by a fixedly screwing portion 68a which is formed at an end of the exposed metal terminal 68. The fixedly screwing portion 68a is disposed at a position higher than a rear-housing-side wall portion 52a (a position outside the rear-side end surface of the housing 52) so that no interference will be caused with the rear-housing-side wall portion 52a and that the metal terminal 24 can be fixedly clamped by means of a generally used tool.

The terminal mount 61 has guides 61b which are integrally molded along the respective L-shaped supports 61a. The guide 61b is axially extended along the axially extended portion 61a-2 of each L-shaped support 61a, and is integrated into the L-shaped support 61a so that an end portion of the guide 61b will also be in contact with the radially extended portion 61a-1.

The guide 61b has a portion 61b-1 corresponding to the plus-side radiating fin 62 and a portion 61b-2 corresponding to the minus-side radiating fin 63. The shapes of the portions 61b-1 and 61b-2 are different from each other. Specifically, the portion 61b-1 has a cylindrical shape (circular cross section) and the portion 61b-2 has a square pole shape (square cross section).

A groove 62b is formed in the plus-side radiating fin 62, at a position corresponding to the portion 61b-1, so as to be suited to the cross section of the portion 61b-1. Similarly, a groove 63a is formed in the minus-side radiating fin 63, at a position corresponding to the portion 61b-2, so as to be suited to the cross section of the portion 61b-2. When the plus-side radiating fin 62 is assembled to the terminal mount 61, the portion 61b-1 of the guide 61b is inserted into the groove 62b of the plus-side radiating fin 62, with a small gap being interposed therebetween, or is press-fitted to the groove 62b. Similarly, when the minus-side radiating fin 63 is assembled to the terminal mount 61, the portion 61b-2 of the guide 61b is inserted into the groove 63a of the minus-side radiating fin 63, with a small gap being interposed therebetween, or is press-fitted to the groove 63a.

In this way, when the metal terminal 24 provided at the end of the winding lead 22a is screwed to the fixedly screwing portion 68a at the end of the metal terminal 68, the possible torsion and deformation in the L-shaped support 61a, which would be caused in the screwing direction, can be suppressed because the side face of the groove 62b of the plus-side radiating fin 62 and the side face of the groove 63a of the minus-side radiating fin 63 come into contact with the side face of the guide 61b. This will thus suppress the bending stress that would be generated, during the assemblage, at a base portion 22b of the winding lead 22a, or at a caulked portion 22c between the metal terminal 24 and the winding lead 22a. Also, the convex shape (projected shape) of the guide 61b, which is integrally molded to the L-shaped support 61a, may give another advantage of suppressing the bending of the L-shaped support 61a in the axial direction of the rotary shaft.

As described above, the plus-side radiating fin 62 disposed near the rear housing 52 is formed with the grooves 62b, each having a cylindrical shape, while the guides 61b of the respective L-shaped supports 61a are provided with the portions 61b-1, each having a cylindrical shape as well. Thus, the portion 61b-1 of each guide 61b is adapted to be fixedly press-fitted to each groove 62b. Under such conditions, the press-fitted portion 61b-1 can serve as a fulcrum when the L-shaped support 61a is deformed in the axial direction of the rotary shaft 31, which may contribute to further suppressing the axial deformation of the L-shaped support 61a.

Figure 7:
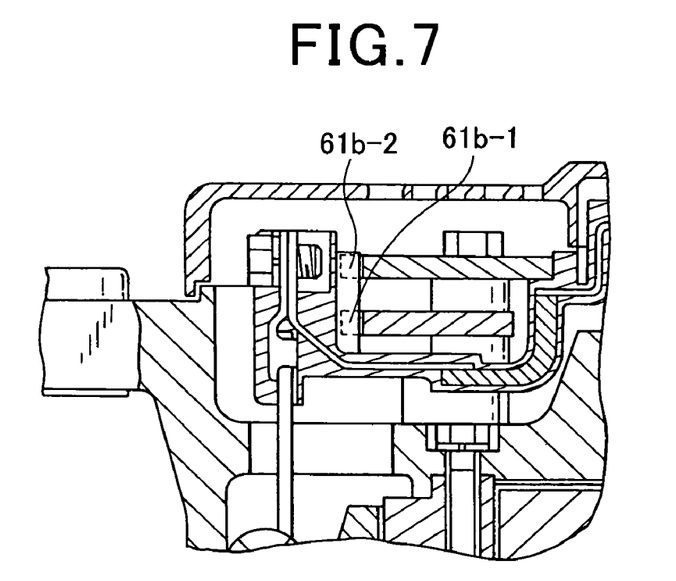
FIG. 7 is a partial cross-sectional view illustrating a rectifier in a modification.

The present invention is not limited to the embodiment described above, but may be implemented with various modifications without departing from the spirit of the present invention. For example, in the embodiment described above, the guide 61b integrally molded to the L-shaped support 61a has been divided into two portions 61b-1 and 61b-2. The portion 61b-1 has a cylindrical shape and the portion 61b-2 has a square pole shape. The portion 61b-1 and the portion 61b-2 may have a square pole shape and a cylindrical shape, respectively. Alternative to these, as shown in FIG. 7, both of the portions 61b-1 and 61b-2 may have a square pole shape. Alternatively, both of the portions 61b-1 and 61b-2 may have a cylindrical shape.

Figure 8:
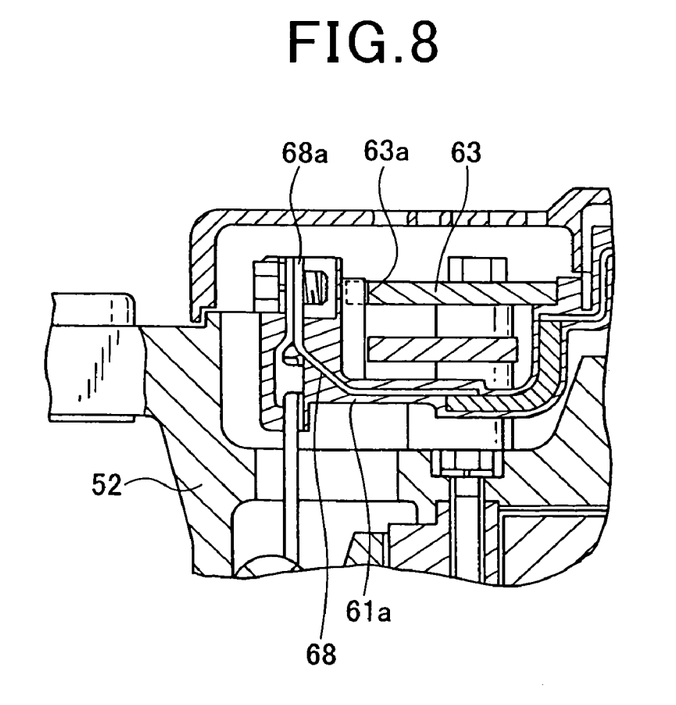
FIG. 8 is a partial cross-sectional view illustrating a rectifier in a modification.

In the embodiment described above, the grooves 62b have been formed in the plus-side radiating fin 62, while the grooves 63a have been formed in the minus-side radiating fin 63. Alternative to this, as shown in FIG. 8, only the minus-side radiating fin 63 located at the position which is far from the surface of the rear housing 52, on which the rectifier is attached, but near the fixedly screwing portion 68a, may have the grooves 63a. With this configuration as well, suppression of the deformation in the screwing direction of the L-shaped support 61a can be advantageously expected, owing to the long distance between the fixedly screwing portion 68a of the metal terminal 68 and the rear housing 52.

In the embodiment described above, the plus-side radiating fin 62 has been disposed near the rear housing 52 and the minus-side radiating fin 63 has been disposed far from the rear housing 52. Alternatively, the positions of these fins may be changed with each other to provide the rectifier 6 for implementation of the present invention. If only the peripheral structure of the rectifier 6 remains unchanged, the present invention can be applied not only to brushless AC generators but also to AC generators with brushes.

In the above embodiment, the guide 61b (first guide) integrally molded with the L-shaped support 61a has been provided with a convex shape, and the grooves 62b and 63a (second guide) have been provided with a concave shape (recessed shape). Contrarily, the first guide and the second guide may have the concave shape and the convex shape, respectively. In other words, the grooves may be formed in the L-shaped supports 61a and the projected guides may be formed in the plus- and minus-side radiating fins 62 and 63, for insertion of the guides into the respective grooves.

Figure 9:
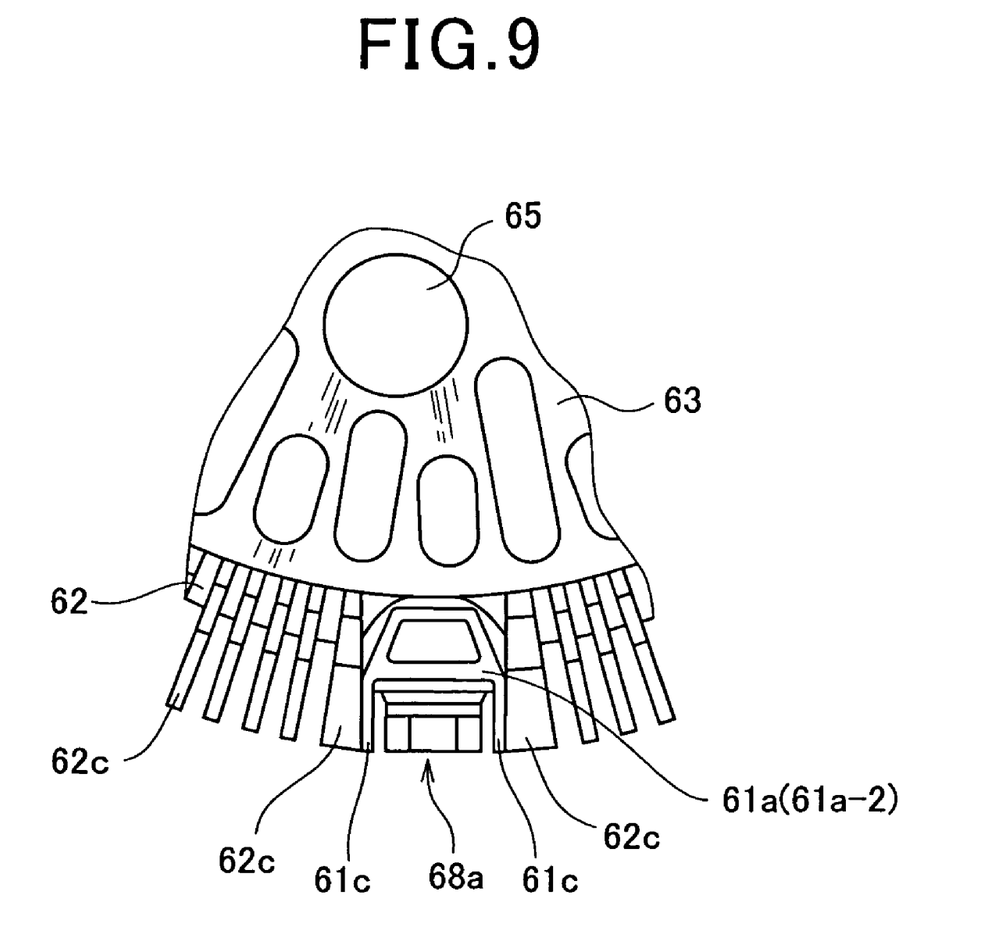
FIG. 9 is a partially enlarged view illustrating a rectifier in a modification.

As shown in FIG. 9, the axially extended portion 61a-2 of the L-shaped support 61a has two outer walls (outer surfaces) 61c opening in the radial direction so as to sandwich the metal terminal 68 (not shown in FIG. 9) therebetween. It may be so configured that, on the sides opposite to the fixedly screwing portion 68a (i.e. on the sides opposite to the metal terminal with respect to the outer walls 61c), the plus-side radiating fin 62, or auxiliary fins 62c of the plus-side radiating fin 62, may be disposed close to the outer walls 61c so that the auxiliary fins 62c may face (oppose to) the outer surfaces of the respective outer walls 61c.

The auxiliary fins 62c are integrally formed with the plus-side radiating fins 62 and axially extended. As shown in FIG. 9, the auxiliary fins 62c facing the outer walls 61c (the auxiliary fins 62c adjacent to the outer walls 61c) are adapted to have a circumferential thickness greater than that of the other auxiliary fins 62c. Thus, deformation of the L-shaped supports 61a may be steadily reduced with the provision of the larger volume for the contact between the outer walls 61c and the respective auxiliary fins 62c of the plus-side radiating fin 62.

It will be appreciated that the present invention is not limited to the configurations described above, but any and all modifications, variations or equivalents, which may occur to those who are skilled in the art, should be considered to fall within the scope of the present invention.

What is claimed is:

1. An AC generator for vehicles, comprising:
   a stator having a stator winding;
   a rotor disposed inside the stator so as to oppose to the stator;
   a field winding that generates magnetic flux to be supplied to the rotor;
   a rectifier including at least one radiating fin to which a plurality of rectifying elements are attached and a terminal mount in which a metal terminal is contained, the rectifying elements rectifying output voltage of the stator winding and outputting the rectified voltage, and the metal terminal connecting the rectifying elements to a lead of the stator winding;
   a housing that accommodates the stator and the rotor; and
   a rear cover that protects electrical components including the rectifier mounted on a rear-side end of the housing, wherein
   the terminal mount includes an L-shaped support having a radial extension, in which the metal terminal is contained and which radially extends about a rotary shaft of the rotor, and an axial extension, which extends from an end of the radial extension toward the rear cover along the rotary shaft, and at least one first guide molded integral with the L-shaped support,
   the radiating fin includes a second guide having a shape corresponding to a shape of the first guide, and
   one of the first guide and the second guide is inserted into the other of the first guide and the second guide.

2. The AC generator according to claim 1, wherein the at least one radiating fin comprises a first radiating fin and a second radiating fin such that a distance between the first radiating fin and a mounting surface of the housing is shorter than a distance between the second radiating fin and the mounting surface.

3. The AC generator according to claim 2, wherein the at least one first guide includes a first portion corresponding to the second guide of the first radiating fin and a second portion corresponding to the second guide of the second radiating fin.

4. The AC generator according to claim 3, wherein the first portion has a cylindrical shape and the second portion has a square-pole shape.

5. The AC generator according to claim 3, wherein the first portion has a square-pole shape and the second portion has a cylindrical shape.

6. The AC generator according to claim 3, wherein both of the first portion and the second portion have a cylindrical shape.

7. The AC generator according to claim 3, wherein both of the first portion and the second portion have a square-pole shape.

8. The AC generator according to claim 2, wherein the second guide of the first radiating fin has a cylindrical shape and the corresponding first guide is press-fitted to the second guide.

9. The AC generator according to claim 2, wherein only the second radiating fin includes the second guide.

10. The AC generator according to claim 1, wherein the at least one first guide has a convex shape and the second guide has a concave shape.

11. The AC generator according to claim 1, wherein the at least one first guide has a concave shape and the second guide has a convex shape.

12. The AC generator according to claim 1, wherein the AC generator is a brushless AC generator.

13. An AC generator for vehicles, comprising:
a stator having a stator winding;
a rotor disposed inside the stator so as to oppose to the stator;
a field winding that generates magnetic flux to be supplied to the rotor;
a rectifier including radiating fin to which a plurality of rectifying elements are attached and a terminal mount in which a metal terminal is contained, the rectifying elements rectifying output voltage of the stator winding and outputting the rectified voltage, and the metal terminal connecting the rectifying elements to a lead of the stator winding;
a housing that accommodates the stator and the rotor; and
a rear cover that protects electrical components including the rectifier mounted on a rear-side end of the housing, wherein
the terminal mount includes an L-shaped support having a radial extension, in which the metal terminal is contained and which radially extends about a rotary shaft of the rotor, and an axial extension, which extends from an end of the radial extension toward the rear cover along the rotary shaft,
the axial extension includes outer surfaces which sandwich the metal terminal therebetween and open in the radial direction, and
the radiating fin is disposed in the opposite sides to the metal terminal with respect to the outer surfaces so as to oppose to the outer surfaces in the vicinity of the outer surfaces.

14. The AC generator according to claim 13, wherein
the radiating fin has a plurality of auxiliary fins which are integrated with the radiating fin and extend in the axial direction, and
at least one of the plurality of auxiliary fins is disposed so as to oppose to the outer surface.

15. The AC generator according to claim 14, wherein the at least one of the plurality of auxiliary fins has a thickness in the circumferential direction greater than that of the other auxiliary fins.

16. The AC generator according to claim 13, wherein the AC generator is a brushless AC generator.

* * * * *